United States Patent
Huynh et al.

(10) Patent No.: US 8,189,931 B2
(45) Date of Patent: May 29, 2012

(54) METHOD AND APPARATUS FOR MATCHING OF BRACKETED PATTERNS IN TEST STRINGS

(75) Inventors: Tien Huynh, Yorktown Heights, NY (US); Stanislav Polonsky, Putnam Valley, NY (US); Isidore Rigoutsos, Astoria, NY (US)

(73) Assignee: International Business Machines Corporation, Armonk, NY (US)

(*) Notice: Subject to any disclaimer, the term of this patent is extended or adjusted under 35 U.S.C. 154(b) by 1182 days.

(21) Appl. No.: 11/969,451

(22) Filed: Jan. 4, 2008

(65) Prior Publication Data

US 2009/0175520 A1    Jul. 9, 2009

(51) Int. Cl.
*G06K 9/00* (2006.01)
*G06F 17/30* (2006.01)
(52) U.S. Cl. .. 382/229; 382/129; 382/181; 707/E17.039
(58) Field of Classification Search ............... 382/229, 382/181, 187, 189, 188, 209, 215, 100, 128, 382/129, 190, 195, 202, 197, 185, 205; 702/19, 702/20, 1; 250/282, 281, 288; 711/170; 436/89, 94; 435/5, 6; 704/241, 255, 253, 704/234, 239, 243, E15.016, E15.005, 238, 704/252; 707/999.006, 999.007, E17.039, 707/999.005; 235/462.1
See application file for complete search history.

(56) References Cited

U.S. PATENT DOCUMENTS

| | | | |
|---|---|---|---|
| 5,278,981 A | 1/1994 | Kawaguchi et al. | |
| 6,463,515 B1 | 10/2002 | Stedman et al. | |
| 6,891,154 B2 | 5/2005 | Zhu et al. | |
| 7,561,974 B2 * | 7/2009 | Shibuya et al. | 702/20 |

OTHER PUBLICATIONS

"Nanogen Issued Patents for Biomarker Discovery and Nucleic Acid Manipulation Technologies", Bioinfo Online—Bioinformatics Portal, http://www.bioinfo-online.net; 2006.

* cited by examiner

*Primary Examiner* — Sheela Chawan
(74) *Attorney, Agent, or Firm* — Scully, Scott, Murphy & Presser, P.C.; Vazken Alexanian

(57) ABSTRACT

A method and system are disclosed for matching input character sequences in a set of input patterns. The method comprises the steps of analyzing the set of input patterns, creating a pattern cluster look-up table (PCLT) based on said input patterns, and defining an offset value k. The PCLT is used to find, for each sequence s and offset k, a set of candidate patterns that can possibly match s, the set of candidate patterns is searched for patterns that match s, and all found matching patterns and sequences are reported.

20 Claims, 5 Drawing Sheets

POSITION

| | 0 | 1 | 2 | 3 | 4 | 5 |
|---|---|---|---|---|---|---|
| | A | A | A | | | |
| | A | A | A | B | C | |
| | A | A | B | | | |
| | A | A | B | A | A | |
| | A | A | B | A | A | A |
| | B | B | | | | |

← 501

↑
└ 502   C-NUMBERS: APPROACH TO REUSE THE RESULTS OF
         A PREVIOUS PATTERN MATCH

FIG. 6

$\Sigma = \{A, C, G, T\}$ ← 601

| EXTENDED ALPHABET | BIT-STRING |
|---|---|
| A | 0001 |
| C | 0010 |
| B for [AC], [CA] | 0011 |
| G | 0100 |
| D for [AG], [GA] | 0101 |
| E for [CG], [GC] | 0110 |
| T | 1000 |
| ● | 1111 |

← 602

| PATTERN WITH BRACKETS | BIT STRING REPRESENTATION |
|---|---|
| A[A,G][A,G]..C[AC]CT.[CG]G | 0001 0101 0101 1111 1111 0010 0011 0010 1000 1111 0110 0100 |

← 603

METHOD AND APPARATUS FOR MATCHING OF BRACKETED PATTERNS IN TEST STRINGS

BACKGROUND OF THE INVENTION

1. Field of the Invention

The present invention relates to pattern matching, and more specifically, to pattern matching in streams of characters. Even more specifically, the invention, in its preferred embodiment, relates to methods and system for pattern matching in biological sequences represented as streams of amino acid or nucleic acid codes.

2. Background Art

Recent years have witnessed an increased focus on creating methodologies that can lower the cost of genomic sequencing while increasing throughput. There are several methods for high throughput sequencing that already are (or will soon be) commercially available through companies such as 454, illumina, Helicos, and others.

The specific methodology notwithstanding, a typical output of a high throughput sequencing run is comprised of a long list of 'reads'. Each read corresponds to a fragment of sequence from the DNA (or RNA) that is analyzed. A list of such reads can contain from a few hundred thousand to several million entries. For the sake of simplicity, in what follows, 'read' is taken to mean the 'payload' sequence, i.e., a sequence that is devoid of 5' and 3' linkers. Each such read can be through of as a sequence S whose length $L_S$ can vary. The sequence S comprises letters selected from an alphabet $\Sigma$ of possible letters. For example, in the case of DNA, four possibilities exist: $\Sigma=\{A, C, G, T\}$. As part of the sequencing process, each position within the sequence S is associated with a quality measure that estimates the confidence in the letter that is being reported for that location within S: if the quality value that is associated with a given position S falls below a threshold, then the corresponding letter is likely to represent a 'sequencing error'. In light of such sequencing errors, one would like to determine the location with the genome at hand that gives rise to the sequence S. One way of handling this problem is to replace those positions of S with low quality estimates by a 'wild card' that can match any (exactly one) of the allowed alphabet $\Sigma$. In the general case, it can be assumed that enough information may be available to restrict the possible candidates at an affected position: in this case, the candidates are denoted using a bracketed expression such as [ACT] which means 'a choice of exactly one letter among A, C and T'; similarly, [AT] means 'either an A or a T', etc.

For example, let S=CAAAAGACGAGGGTCTCAGGAAAAACC and let the underlined letters be the ones corresponding to low confidence values. If each of the presumed 'sequencing errors' is replaced by either a wild card, denoted by '.', or a bracketed expression, a new sequence S' is obtained. One such sequence S' could be, for example, S'=C.[AT].AG.CGAGGGTC[ACG]CAGGA.[GT]AACC. If this operation is repeated for each of the numerous sequences in the list of reads of a typical run, a list of patters is generated with 'rigid gaps'—captured by the various wild cards and bracketed expressions—whose counterparts in the genome at hand need to be identified. In a realistic setting, one will be presented at this stage with a collection of tens of thousands of patterns that may or may not contain rigid gaps and which will need to be located in a target genomic sequence. If a pattern has multiple instances in the genomic sequence, all such instances will need to be identified and reported. In the general case, the patters will have variable-lengths.

Even though a specific context is used to introduce it, the problem of quickly locating in a target database all instances of a potentially large collection of variable length, rigid patterns, containing wild cards and bracketed expressions arises in many settings. The present invention provides a method for solving this problem.

SUMMARY OF THE INVENTION

An object of this invention is to improve methods and systems for matching patterns.

Another object of the invention is to provide a method and system for pattern matching in streams of characters.

A further object of the present invention is to provide a system and method for matching patterns in biological sequences represented as streams of amino acid or nucleic acid codes.

Another object of the present invention is to locate quickly in a target database all instances of a potentially large collection of variable lengths, rigid patterns containing wild cards and bracketed expressions.

These and other objectives are attained with a method of and system for matching input character sequences in a set of input patterns. The method comprises the steps of analyzing the set of input patterns, creating a pattern cluster look-up table (PCLT) based on said input patterns, and defining an offset value k. The PCLT is used to find, for each sequence s and offset k, a set of candidate patterns that can possibly match s, the set of candidate patterns is searched for patterns that match s, and all found matching patterns and sequences are reported.

For example, in a preferred embodiment, the PCLT may be created by storing in the PCLT pattern clusters for every possible sequence prefix that can be derived from prefixes of the set of input patterns. Also, in this preferred embodiment, when the candidate patterns are searched, they are searched in a defined sequence for patterns that match s. Further, preferably, the analyzing step includes the step of deriving a base alphabet from the set of input patterns, deriving an extended alphabet from said base alphabet, and expressing the input patterns in that extended alphabet.

Further benefits and advantages of this invention will become apparent from a consideration of the following detailed description, given with reference to the accompanying drawings, which specify and show preferred embodiments of the invention.

BRIEF DESCRIPTION OF THE DRAWINGS

FIG. 5 shows how coincidence numbers are obtained.

FIG. 6 illustrates a bit string representation of a character sequence.

DETAILED DESCRIPTION OF THE PREFERRED EMBODIMENTS

Figures 1, 2:
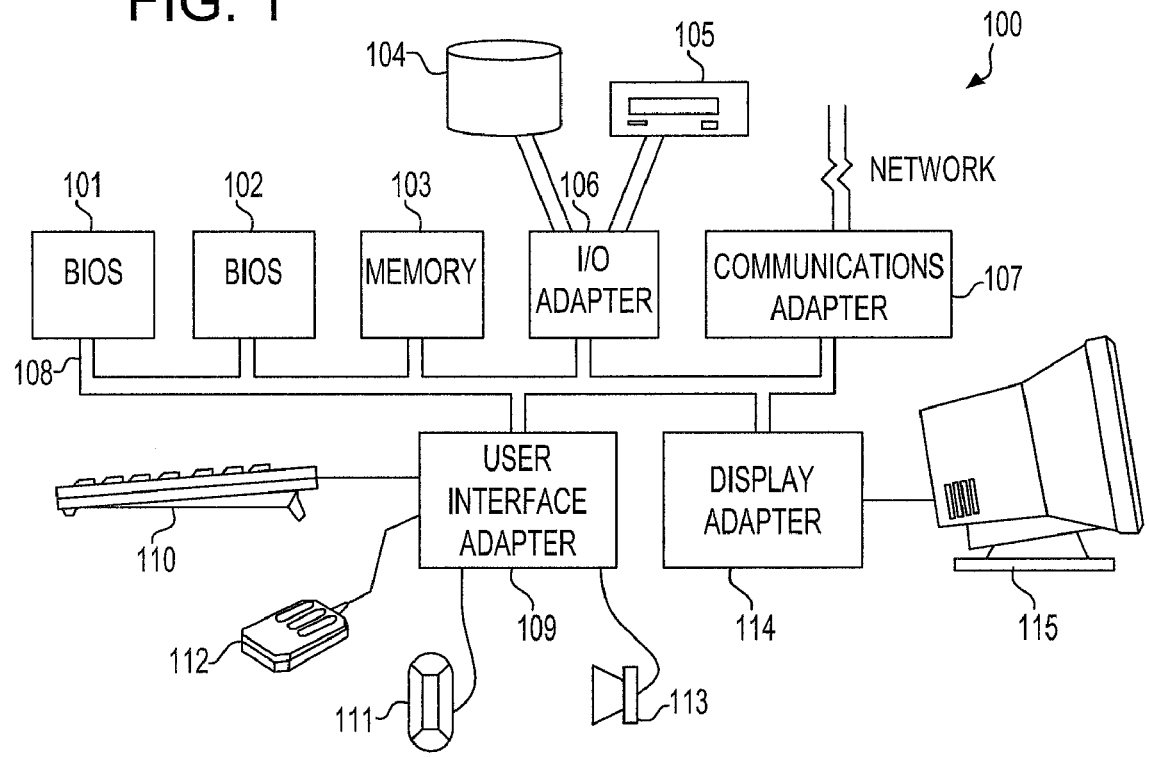
FIG. 1 is a block diagram of a computer system wherein the present invention may be embodied.
FIG. 2 is a flow chart of a preferred pattern-matching algorithm.

The present invention relates to pattern matching, and in its preferred implementation, a computer or computer system is used to carry out the invention. Any suitable computer or computer system may be used, and, for example, FIG. 1 illustrates one suitable computer system.

This computer system, indicated generally at 100, includes a central processing unit (CPU) 101 connected via at least one bus 108 to a basic input output system (BIOS) firmware 102, and memory, such as RAM, ROM, EEPROM, and other memory devices, collectively designated by reference numeral 103. System 100 further includes an input/output adapter 106 for connecting peripheral devices such as disk drive 104 and tape drive 105, and a display adapter 114 for connecting a display device 115 such as a Flat Panel Display (FPD) or a Cathode Ray Tube (CRT).

A user interface adapter 109 is provided for connecting a keyboard 110, a mouse 112, a speaker 113, a microphone 111, and/or other user interface devices such as game controllers, touch pads, etc. System 100 also includes a communications adapter 107 for connecting system 100 to an information network such as an Intranet or the Internet. BIOS firmware 102 includes a built-in software program, referenced generally as BIOS, accessible to system 100. The BIOS includes instructions for controlling the system's devices and testing memory when system 100 is initially powered up.

In order to facilitate description of the pattern matching method of the present invention, a set of definitions follows.

Alphabet $\Sigma$ is a finite set of elements $\{c_1, c_2, \ldots\}$. The elements of $\Sigma$ are interchangeably referred to as symbols or characters. An example of alphabet is a set of 24 English characters. Other possible alphabets may be comprised of 4 nucleic acid symbols $\Sigma_{NA}=\{A,C,G,T\}$, or 20 amino acid symbols $\Sigma_{AA}=\{A,C,D,E,F,G,H,I,K,L,M,N,P,Q,R,S,T,V,W,Y\}$. In subsequent examples, we will use nucleic acid alphabet.

Sequence is a string of symbols from alphabet $\Sigma$. An example of nucleic acid sequence is ACCGTA. For every sequence s we use length(s) to denote the length of s. For example, length(ACCGTA)=6. Notation s[i] refers to i-th symbol of sequence s. Index i is referred to as offset. Offset i=0 corresponds to the first symbol of a sequence. Notation s[i: j] refers to a substring of s between i-th and j-th symbols.

Extended alphabet $\tilde{\Sigma}$ is a union $\Sigma \uparrow B$, where B is a finite set of so called bracket symbols. Each bracket symbol corresponds to a unique subset $b \subset \Sigma$. The notation for bracket symbol is a text representation of b enclosed in square brackets. For example, the text representation of b={A,C} is [AC]. There is a special notation for the case b=$\Sigma$. This bracket symbol is written as "." and is referred to as "don't care" symbol.

A character $\tilde{c} \in \tilde{\Sigma}$ is said to match a "regular" character $c \in \Sigma$ if either of the following two cases is true: (1) $\tilde{c}$ is a regular character and it equals c, or (2) $\tilde{c}$ is a bracket symbol and c is one of the characters inside brackets. For example bracket symbol [AC] matches regular character A, but not G.

Pattern is a string of symbols from extended alphabet $\tilde{\Sigma}$. An example of nucleic acid pattern is A[AC].G. Similar to sequences, the length(p) is a length of pattern p.

Pattern p of length l is said to match string s at offset k if p[i] matches s[k+i] for all i, $0 \leq i < k$. For example, pattern A[AC].G matches sequence TGACTG at offset 2.

For a given sequence s, prefix Pr(s) is defined as first prefsz characters of s: Pr(s)=s(0:prefsz−1). Prefix of pattern p is defined similarly: Pr(p)=p(0:prefsz−1). Parameter prefsz is called prefix length.

Pattern block pb is defined as a set of patterns with the same prefix. For example, assuming prefsz=3 patterns A[AC]GTC and A[AC]GAA belong to the same pattern block, while pattern A[GT]GTC belongs to a different block.

For given sequence prefix x, pattern cluster pc(x) is defined as a union of all pattern blocks that match x:

$$pc(x) = \bigcup_{\forall i: pb_i \text{ matches } x} pb_i$$

FIG. 2 is a general flow-chart exemplifying the matching algorithm. The first two steps are preparatory—the input pattern set P is analyzed and preprocessed (201, see FIG. 3 for details), and a pattern cluster look-up table (PCLT) is created (202, see FIG. 7 for details). PCLT stores pattern clusters for every possible sequence prefix that can be derived from prefixes of input pattern set P. The prefix size prefsz used for construction of PCLT is the only parameter of our method and should be defined in advance.

The following steps implement actual pattern matching. For each input sequence s and offset k, the algorithm uses look-up table PCLT to find a pattern cluster pc(s,k) that matches s[k:k+prefsz−1], or, in other words, a set of "candidate patterns" that can possibly match s (203, see FIG. 8 for details). All other patterns from the input set are guaranteed to not match s at k. Typically, the number of candidate patterns is significantly smaller then that in original pattern set P. This fact is a key factor that improves the speed of presented algorithm. The candidate patterns are searched sequentially for matching patterns (204, see FIG. 9 for details). To further improve the speed, the search relies on reusing the results of previous pattern match. Finally, the algorithm reports all found matching patterns and sequences (205).

Figure 3:
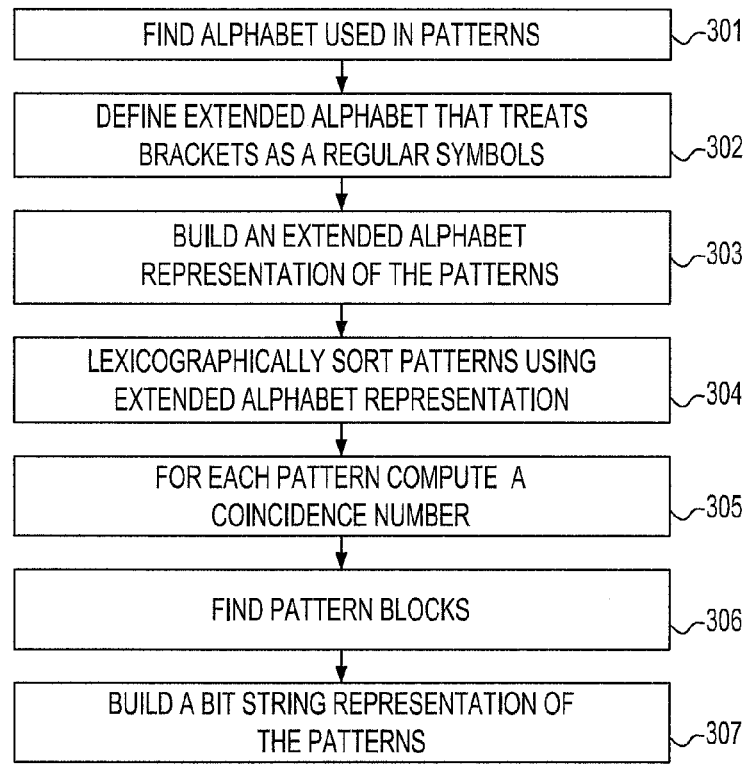
FIG. 3 is a flow chart showing in more detail the pattern analysis and preprocessing step of the algorithm of FIG. 2.

FIG. 3 is a detailed flow chart exemplifying step 201 of the algorithm—pattern analysis and preprocessing. First, the alphabet is derived from input patterns (301). Typically, for nucleic acids the alphabet consists of 4 characters, for amino acids it has 20 characters. Second, all different brackets in PS are enumerated and replaced by new characters. Thus the number of new characters coincides with that of unique brackets in the input patterns set, including ".". Addition of new characters to existing alphabet produces extended alphabet (302). Original representation of patterns (i.e. with brackets) is replaced by that based extended alphabet (303), as illustrated on FIG. 4.

The extended alphabet representation is lexicographically sorted (304) and coincidence number is computed for each pattern (305). Coincidence numbers or, simply, c-numbers measure the number of leftmost characters shared by consecutive patterns. The concept of coincidence numbers is illustrated on FIG. 5. Next, the algorithm finds pattern blocks (306). Pattern block is a set of consecutive patterns that have the same first prefsz characters. The easiest way to find if two consecutive patterns p1, p2 belong to the same block is check if c(p2)>prefsz, where c(p2) is a c-number of p2.

Finally, an additional representation of pattern set is created—bit string representation (307). Bit-string representation is used during step 204, sequential search among candidate patterns. It is illustrated on FIG. 6.

Figure 4:
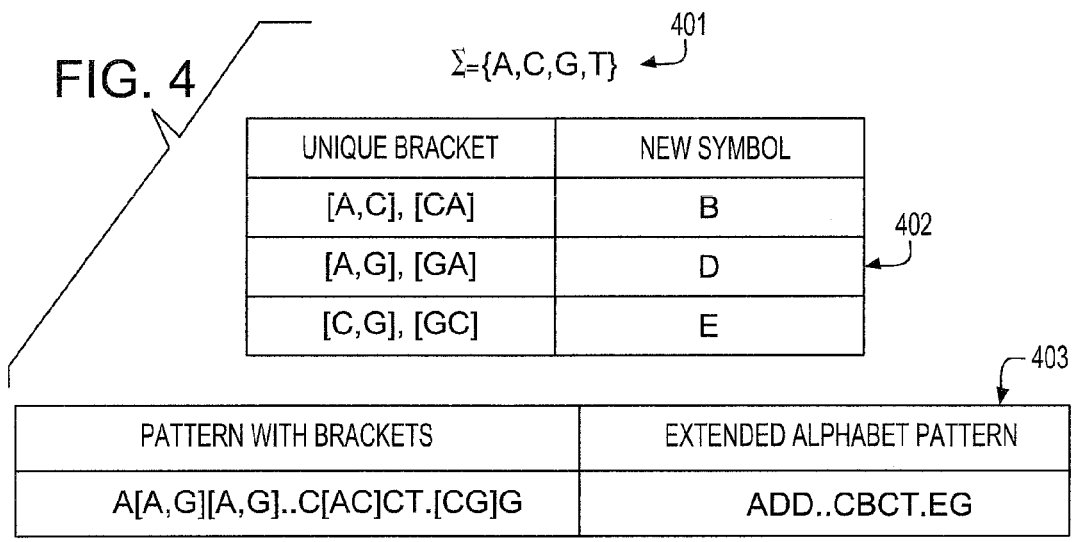
FIG. 4 is a flow chart illustrating in more detail alphabet extension step of FIG. 2

FIG. 4 illustrates the concept of alphabet extension for a case nucleic acid alphabet. The original alphabet $\Sigma$ consists of 4 symbols {A,C,G,T} (401). In this example, the input patterns have three brackets [A,C], [A,G], and [C,G]. Three new symbols B,D,E are introduced, each corresponding to its own bracket (402). Finally, the bracketed representation of an input pattern is replaced by extended alphabet representation (403).

FIG. 5 illustrates the concept of c-numbers using a set 501 of lexicographically ordered patterns p1=AAA to p6=BB. C-number of the first pattern is 0 by definition: c(p1)=0. For any subsequent pattern p, c-number c(p) is defined as a number of leftmost characters of p that coincide with that of preceding pattern r. For example, pattern p2 shares 3 equal characters AAA (shown in bold) with p1, so c(p2)=3. If a pattern does not share any characters with a previous pattern, its c-number equals 0 (e.g. pattern p6). A list of c-numbers for patterns 501 is indicated by 502.

FIG. 6 illustrates the concept of bit string representation using nucleic acid alphabet 601. To facilitate quick matching between characters $\tilde{\Sigma}$ and $\Sigma$, we employ bit strings to encode characters of $\tilde{\Sigma}$ and $\Sigma$. The length of the bit string is set to the cardinality of $\Sigma$. The mechanism of building the bit string representation is as follows (602):

Bit string representation bstring($c_i$) of i-th regular symbol $c_i \in \Sigma$ is a bit string with all zeros except one in i-th position. For example, bstring(A)=0001, and bstring(C)=0010.

Bit string representation bstring(b) of a bracket symbol b=$\tilde{\Sigma}\backslash\Sigma$ is a bitwise OR the bit string representations of the regular characters that constitute b. For example, bstring([AC])=0011.

In order to compare if $\tilde{c} \in \tilde{\Sigma}$ matches $c \in \Sigma$, we check if the bitwise AND of the bit strings representations is non-zero. For example, to check if [AC] matches A, one would need to compare if 0011 ∧0001=0001 with 0000. In this particular case, the two characters match. The bit string representation of patterns and/or sequence is concatenation of constituent character bit strings (603)

Figure 7:
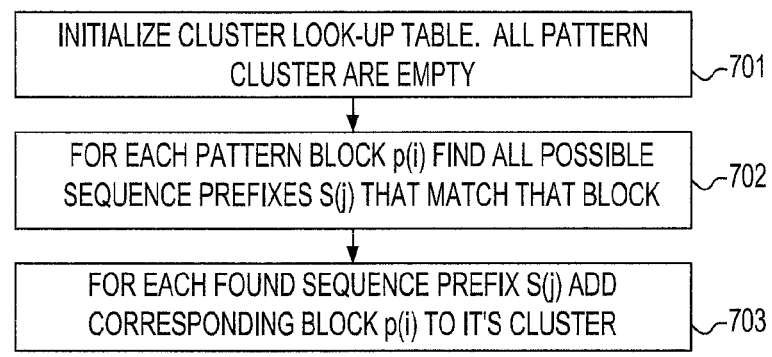
FIG. 7 shows a preferred procedure for creating a pattern cluster look-up table.

FIG. 7 is a flow chart exemplifying step 202 of the algorithm (create pattern look-up table). Initially, all entries of the look-up table point at empty clusters CL(•)=Ø (701). For each pattern block B with prefix Pr(B), a set M(B) of all possible prefsz-character strings matching prefix Pr(B) is created (702). For example, for a pattern block with prefix Pr(B)=A [CD]A, the set includes two strings: M(B)={ACA, ADA}. Next, for each string s∈M(B) use look-up table to locate corresponding cluster CL(s) and augment it with the block B: CL(s)=CL(s)∪B (703)

Figure 8:
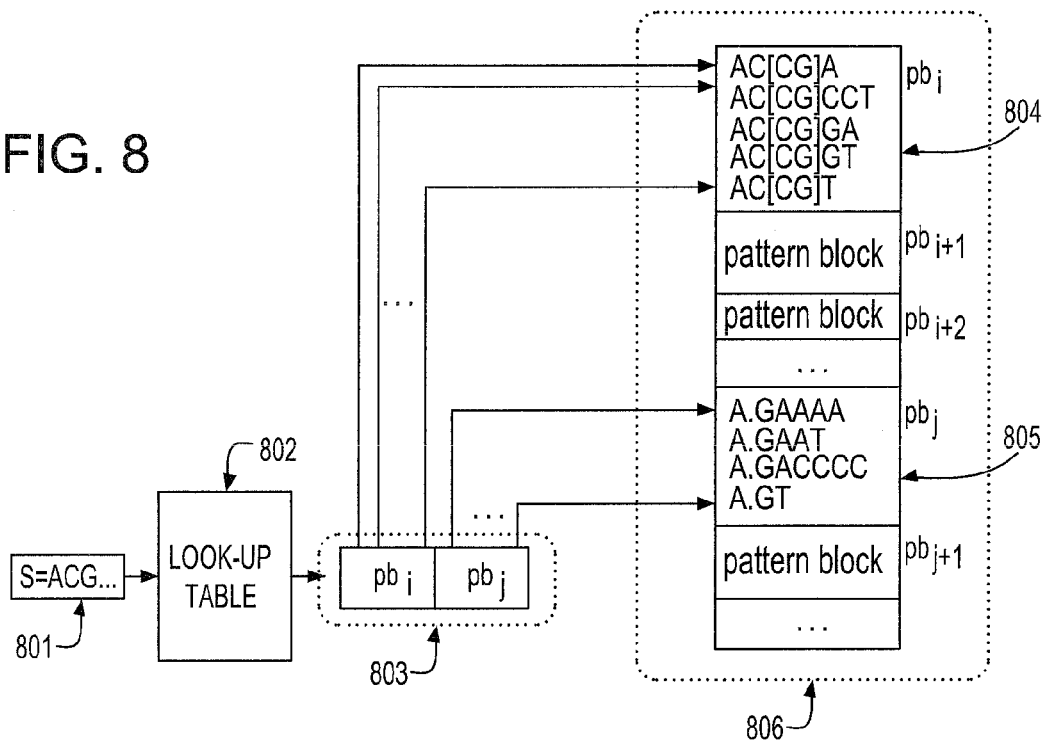
FIG. 8 illustrates a preferred technique for finding candidate-matching patterns.

FIG. 8 illustrates step 203 (find a set of candidate patterns) of the general flow chart. For a given sequence s 801 with prefix ACG, a look-up table 802 points to a pattern cluster 803. The cluster is comprised of pointers to the patterns comprising two pattern blocks pb_i (804) and pb_j (805) respectively from the input pattern set 806. The pattern blocks pb_i and pb_j comprise patterns with prefixes AC[CG] and A.G, respectively; all of the patterns match the prefix ACG of sequence s.

Figure 9:
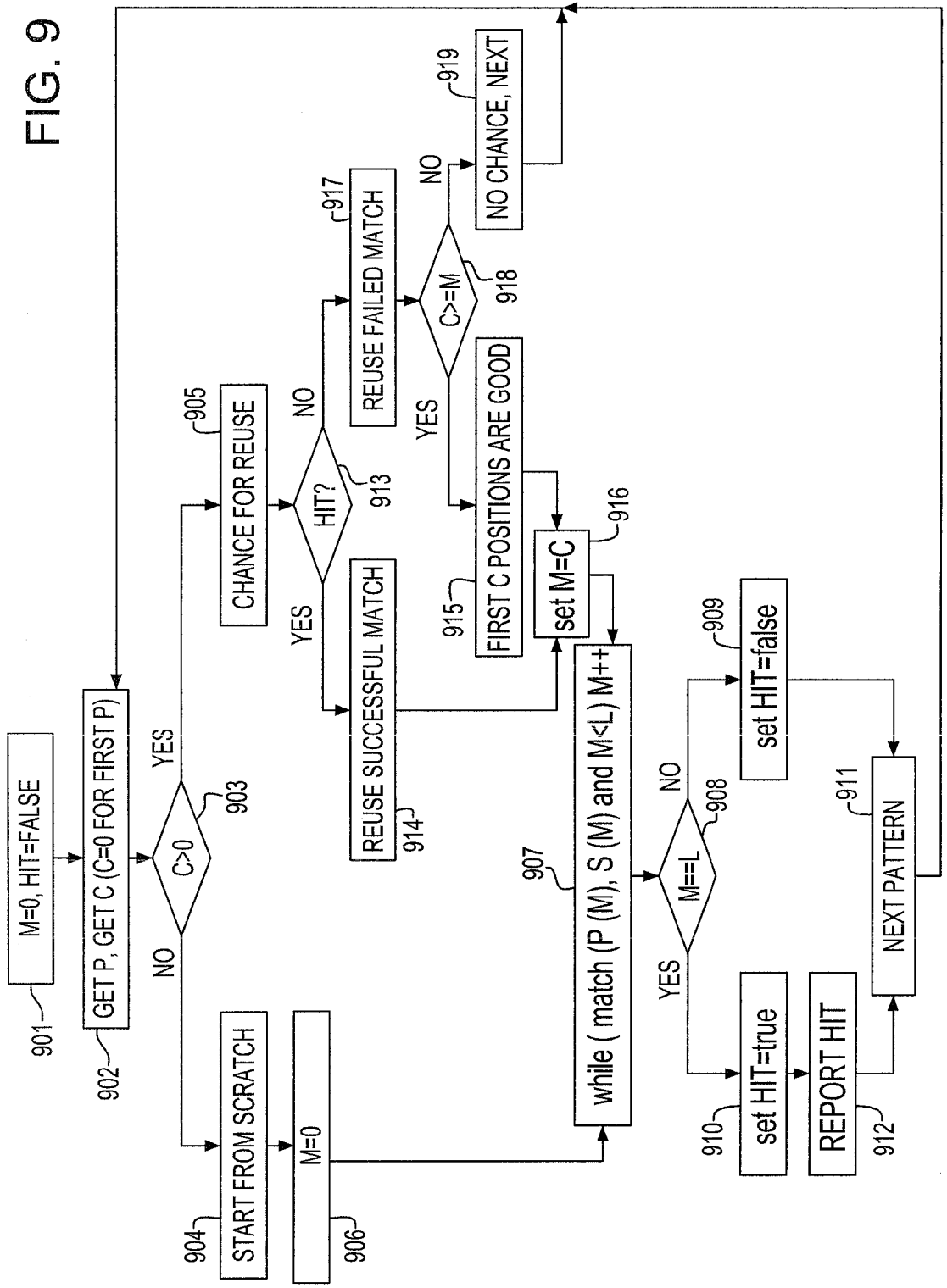
FIG. 9 is a flow chart showing a sequential search among the candidate patterns for a matching pattern.

FIG. 9 is a flow chart exemplifying step 204 (sequential search among candidate patterns) of a general flow chart. Integer variable M denotes the position of a first non-matching character from a previous match; logical variable HIT is TRUE if the previous match was successful and FALSE otherwise. Initially M=0 and HIT=FALSE (901). For every pattern p from candidate pattern set, assign the value of its c-number to the integer variable C (902). Depending on the value of C (903) there could be two alternatives. If c≦0 then the previously matched pattern does not share any symbols with the current p and there is no chance to reuse the previous match results (904). If C>0 then a chance exists to reuse the previous match (905).

In the former case (904) the position M of a symbol currently being matched is set to 0 (906) and sequential match between p[M] and s[M] is performed (907). The matching (907) proceeds until the first mismatch is found or M reaches the length L of pattern p. The former case means that the pattern does not match the sequence (909) and the next pattern should be tried (911). The later case means that the pattern matches the sequence (910). This event (a.k.a. hit) is reported (912) and the algorithm proceeds to the next pattern (911).

The algorithm takes a different branch when a chance exists for the previous match reuse (905). Depending on the result of the previous pattern match (913) it can take two different directions. If the previous pattern was a hit (914), then all its symbols were matched, including the first C symbols that coincide with those of the current pattern. Consequently, there is no need to match these symbols; the position M is set to C (916) and matching (907) proceeds for the rest of p. Alternatively, if the previous pattern match failed (917) there is a possibility to reuse first M successful matches of the previous pattern. To find out if this is possible, one needs to compare (918) M with the coincidence number c of the current pattern. If M≧C then the first C symbols of p are guaranteed to match (915). For this case M is set to C (916) and matching (907) proceeds for the rest of p. In the opposite case (919), M<C, p certainly does not match since one of the symbols, shared between p and the previous pattern, has already failed to match.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of matching input character sequences in a set of input patterns, comprising the steps of:

analyzing the set of input patterns, each of the input patterns comprising a sequence of positions;

creating a pattern cluster look-up table (PCLT) based on said input patterns;

defining an offset value k;

for each sequence s and the offset value k, using the PCLT to find a set of candidate patterns, starting at the kth position in each of the input patterns, that can possibly match said each sequence s;

searching through the set of candidate patterns for patterns that match said each sequence s; and reporting all found matching patterns and sequences.

2. A method according to claim 1, wherein the creating step includes the step of storing in the PCLT pattern clusters for every possible sequence prefix that can be derived from prefixes of the set of input patterns.

3. A method according to claim 1, wherein the searching step includes the step of searching through the candidate patterns in a defined sequence for patterns that match s.

4. A method according to claim 1, wherein the analyzing step includes the step of deriving a base alphabet from the set of input patterns.

5. A method according to claim 4, wherein:

the analyzing step includes the further steps of
  i) deriving an extended alphabet from said base alphabet, and
  ii) expressing the input patterns in said extended alphabet; and the using step includes the step of, for each pattern, determining a coincidence number measuring the number of characters, in a defined order, shared by said each pattern and another one of the patterns.

6. A method according to claim 1, wherein the using step includes the step of identifying a set of patterns having the same given number of characters in a defined order.

7. A method according to claim 1, wherein the creating step includes the step of storing in the (PCLT) pattern clusters for prefixes derived from the set of input patterns.

8. A method according to claim 7, wherein the storing step includes the step of storing in the (PCLT) pattern clusters for prefixes derived from prefixes of the set of input patterns.

9. A method according to claim 1, wherein the step of using the (PCLT) includes the step of, for each sequence s, using a prefix of the sequence to identify a pattern cluster.

10. A method according to claim 9, wherein said cluster includes a first pointer to a first pattern block, and a second pointer to a second pattern block.

11. The method according to claim 1, comprising the further step of: using a computer system, implementing a character matching algorithm, to perform the steps of creating the pattern cluster look-up table, using the PCLT to find the set of candidate patterns, and searching through the set of candidate patterns.

12. A system for matching input character sequences in a set of input patterns, comprising:

one or more processing units configured for:

analyzing the set of input patterns, each of the input patterns comprising a sequence of positions;

creating a pattern cluster look-up table (PCLT) based on said input patterns;

defining an offset value k;

using the PCLT to find, for each sequence s and the offset value k, a set of candidate patterns, starting at the kth position in each of the input patterns, that can possibly match said each sequence s;

searching through the set of candidate patterns for patterns that match s; and reporting all found matching patterns and sequences.

13. A system according to claim 12, wherein the searching includes searching through the candidate patterns in a defined sequence for patterns that match said each sequence s.

14. A system according to claim 12, wherein the analyzing includes deriving a base alphabet from the set of input patterns.

15. A system according to claim 14, wherein:

the analyzing further includes:
  i) deriving an extended alphabet from said base alphabet, and
  ii) expressing the input patterns in said extended alphabet; and the PCLT using includes determining, for each pattern, a coincidence number measuring the number of characters, in a defined order, shared by said each pattern and another one of the patterns.

16. A system according to claim 12, wherein the using the PCLT includes identifying a set of patterns having the same given number of characters in a defined order.

17. A program storage device readable by computer, tangibly embodying a program of instructions executable by the computer to perform method steps for matching input character sequences in a set of input patterns, said method steps comprising:

analyzing the set of input patterns, each of the input patterns comprising a sequence of positions;

creating a pattern cluster look-up table (PCLT) based on said input patterns;

defining an offset value k;

for each sequence s and the offset value k, using the PCLT to find a set of candidate patterns, starting at the kth position in each of the input patterns, that can possibly match said each sequence s;

searching through the set of candidate patterns for patterns that match said each sequence s; and reporting all found matching patterns and sequences.

18. A program storage device according to claim 17, wherein the creating step includes the step of storing in the PCLT pattern clusters for every possible sequence prefix that can be derived from prefixes of the set of input patterns.

19. A program storage device according to claim 17, wherein the searching step includes the step of searching through the candidate patterns in a defined sequence for patterns that match s.

20. A program storage device according to claim 17, wherein:

the analyzing step includes the steps of:

deriving a base alphabet from the set of input patterns;

deriving an extended alphabet from said base alphabet;

expressing the input patterns in said extended alphabet; and the using step includes:

the step of, for each pattern, determining a coincidence number measuring the number of characters, in a defined order, shared by said each pattern and another one of the patterns; and the step of identifying a set of patterns having the same given number of characters in a defined order.

* * * * *